US011899383B1

(12) United States Patent
Kouzu

(10) Patent No.: US 11,899,383 B1
(45) Date of Patent: Feb. 13, 2024

(54) PREVENTION OF TRANSFER BELT BREAKAGE IN AN IMAGE FORMING APPARATUS

(71) Applicant: TOSHIBA TEC KABUSHIKI KAISHA, Tokyo (JP)

(72) Inventor: Norio Kouzu, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/885,582

(22) Filed: Aug. 11, 2022

(51) Int. Cl.
*G03G 15/16* (2006.01)
*G03G 15/08* (2006.01)

(52) U.S. Cl.
CPC ..... *G03G 15/1615* (2013.01); *G03G 15/0855* (2013.01); *G03G 2215/1623* (2013.01)

(58) Field of Classification Search
CPC ....................... G03G 15/1615; G03G 15/0855
See application file for complete search history.

(56) References Cited

U.S. PATENT DOCUMENTS

2016/0187819 A1 6/2016 Tajiri et al.

FOREIGN PATENT DOCUMENTS

JP 2010134149 A * 6/2010

OTHER PUBLICATIONS

Machine translation of JP2010134149 (Year: 2010).*

* cited by examiner

*Primary Examiner* — Walter L Lindsay, Jr.
*Assistant Examiner* — Andrew V Do
(74) *Attorney, Agent, or Firm* — Amin, Turocy & Watson, LLP

(57) ABSTRACT

An image forming apparatus in an embodiment includes an image carrying body, a transfer body, a first mechanism, a sensor, and a second mechanism. The image carrying body carries an image of a developer. The image of the developer is transferred onto the transfer body from the image carrying body. The first mechanism separates the transfer body from the image carrying body. The sensor detects a state of the surface of the transfer body. The second mechanism separates the sensor from the transfer body in association with the first mechanism.

20 Claims, 8 Drawing Sheets

PREVENTION OF TRANSFER BELT BREAKAGE IN AN IMAGE FORMING APPARATUS

FIELD

Embodiments described herein relate generally to an image forming apparatus.

BACKGROUND

An image forming apparatus includes a transfer belt and a sensor. A toner image is transferred onto the transfer belt. The sensor detects the concentration of toner on the transfer belt. A transfer belt unit is sometimes removed from the image forming apparatus at a maintenance time. There has been a demand for an image forming apparatus that can improve reliability at the maintenance time.

DETAILED DESCRIPTION

An image forming apparatus in an embodiment includes an image carrying body, a transfer body, a first mechanism, a sensor, and a second mechanism. The image carrying body carries an image of a developer. The image of the developer is transferred onto the transfer body from the image carrying body. The first mechanism separates the transfer body from the image carrying body. The sensor detects a state of the surface of the transfer body. The second mechanism separates the sensor from the transfer body in association with the first mechanism.

The image forming apparatus in the embodiment is explained below with reference to the drawings.

Figure 1:
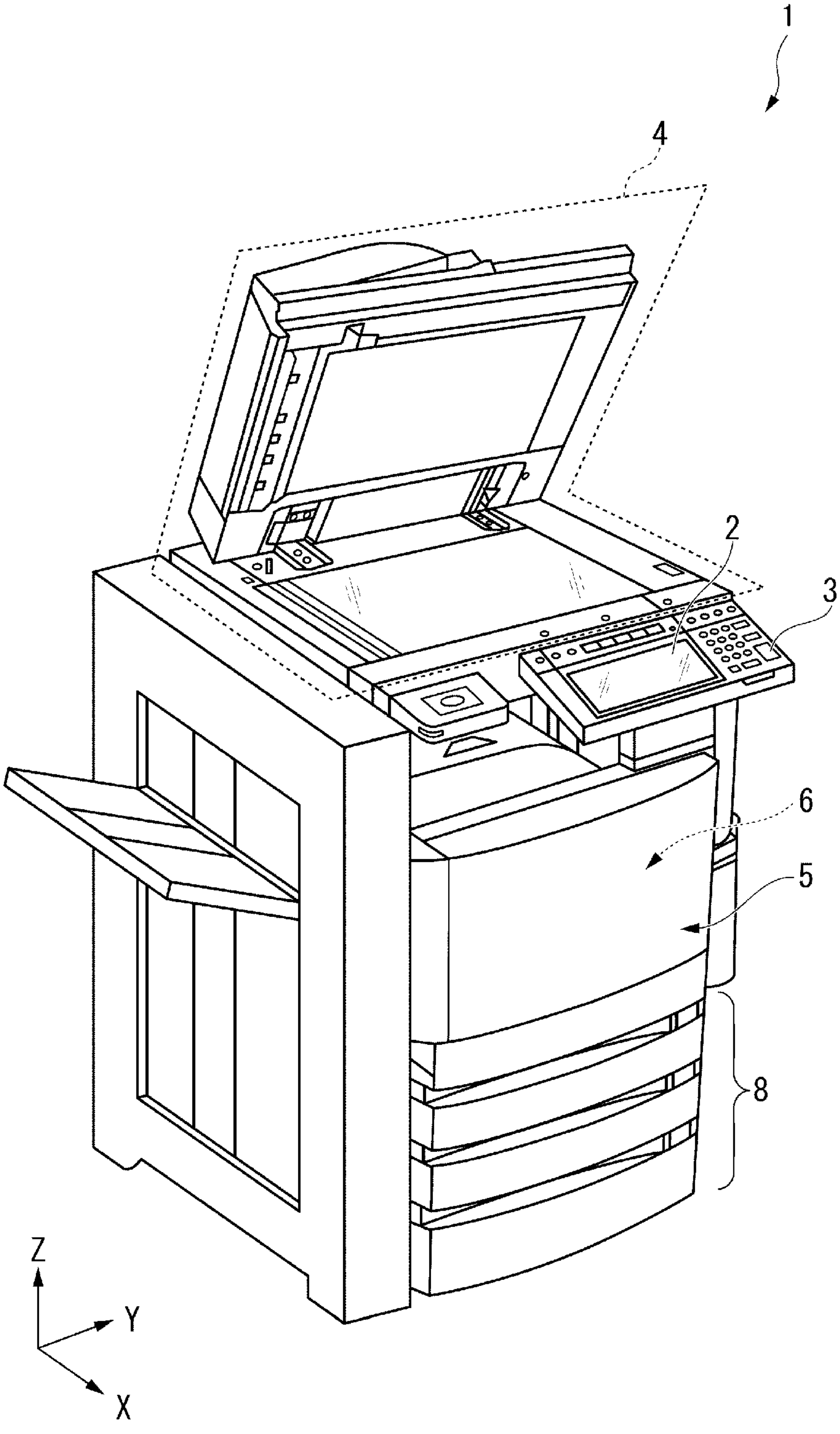
FIG. 1 is a perspective view of an image forming apparatus.

FIG. 1 is a perspective view of an image forming apparatus 1. For example, a Z direction explained below is the vertical direction and a +Z direction is the upward direction. For example, an X direction explained below is the front-rear direction of the image forming apparatus 1 and a +X direction is the forward direction. For example, a Y direction explained below is the left-right direction of the image forming apparatus 1. The Z direction, the X direction, and the Y direction are orthogonal to one another.

The image forming apparatus 1 forms an image on a sheet. The image forming apparatus 1 is, for example, a multi function printer (MFP) or a copying machine.

The image forming apparatus 1 includes a display 2, a control panel unit 3, an image reading unit 4, an image forming unit 5, and a sheet supply device 8.

The display 2 and the control panel unit 3 are used by a user to perform operation input for causing the image forming apparatus 1 to operate. The display 2 displays operation content performed by the user and a message to the user.

The image reading unit 4 reads a document and forms an image signal of an image to be formed by the image forming unit 5.

The image forming unit 5 forms an image on a sheet based on the operation input or a signal from the outside. The image forming unit 5 includes a transfer unit 6 explained below.

The sheet supply device 8 is disposed in a lower part of the image forming apparatus 1. The sheet supply device 8 supplies a sheet to the image forming unit 5.

Figure 2:
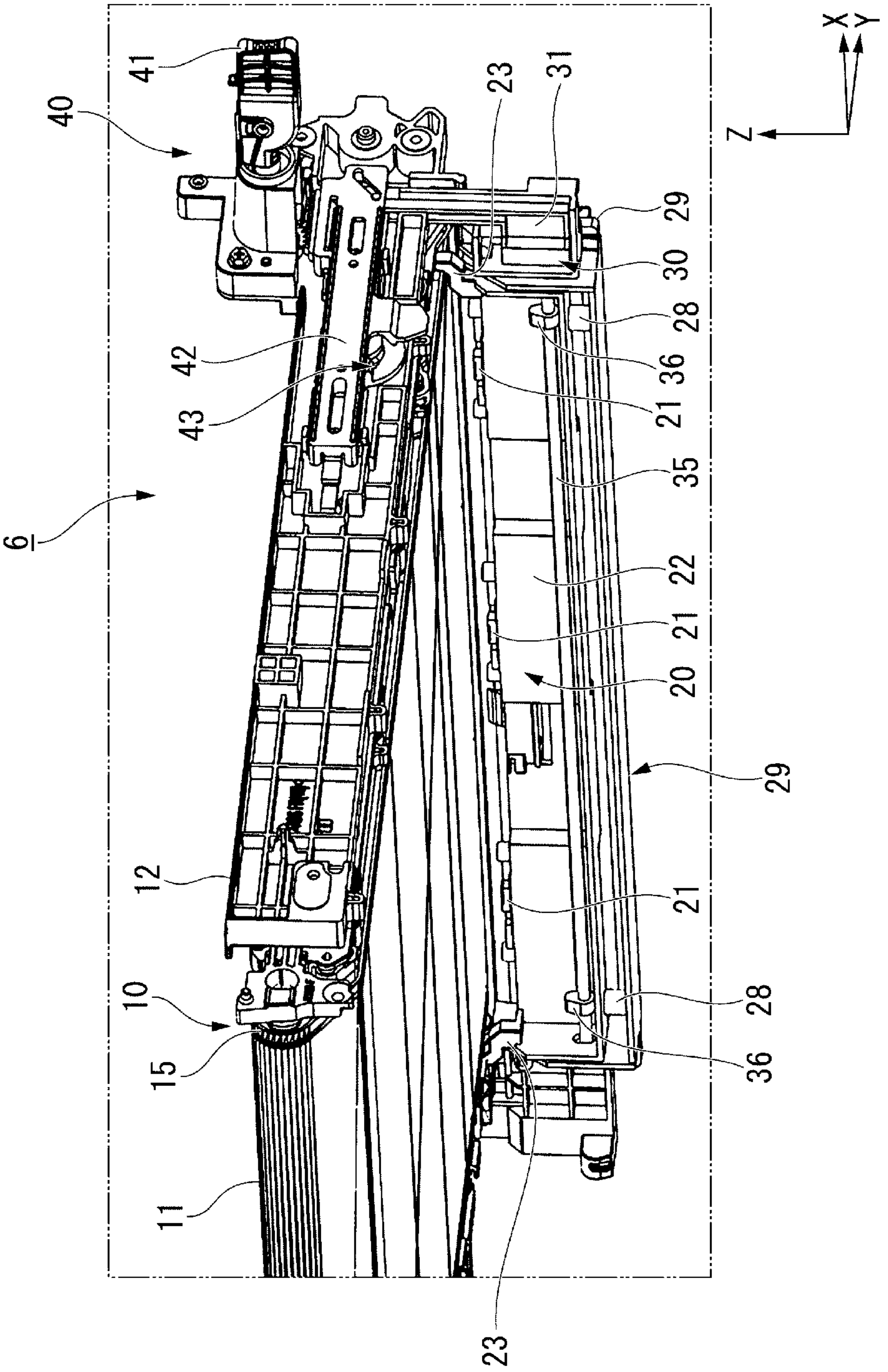
FIG. 2 is a perspective view of a transfer unit.
Figure 3:
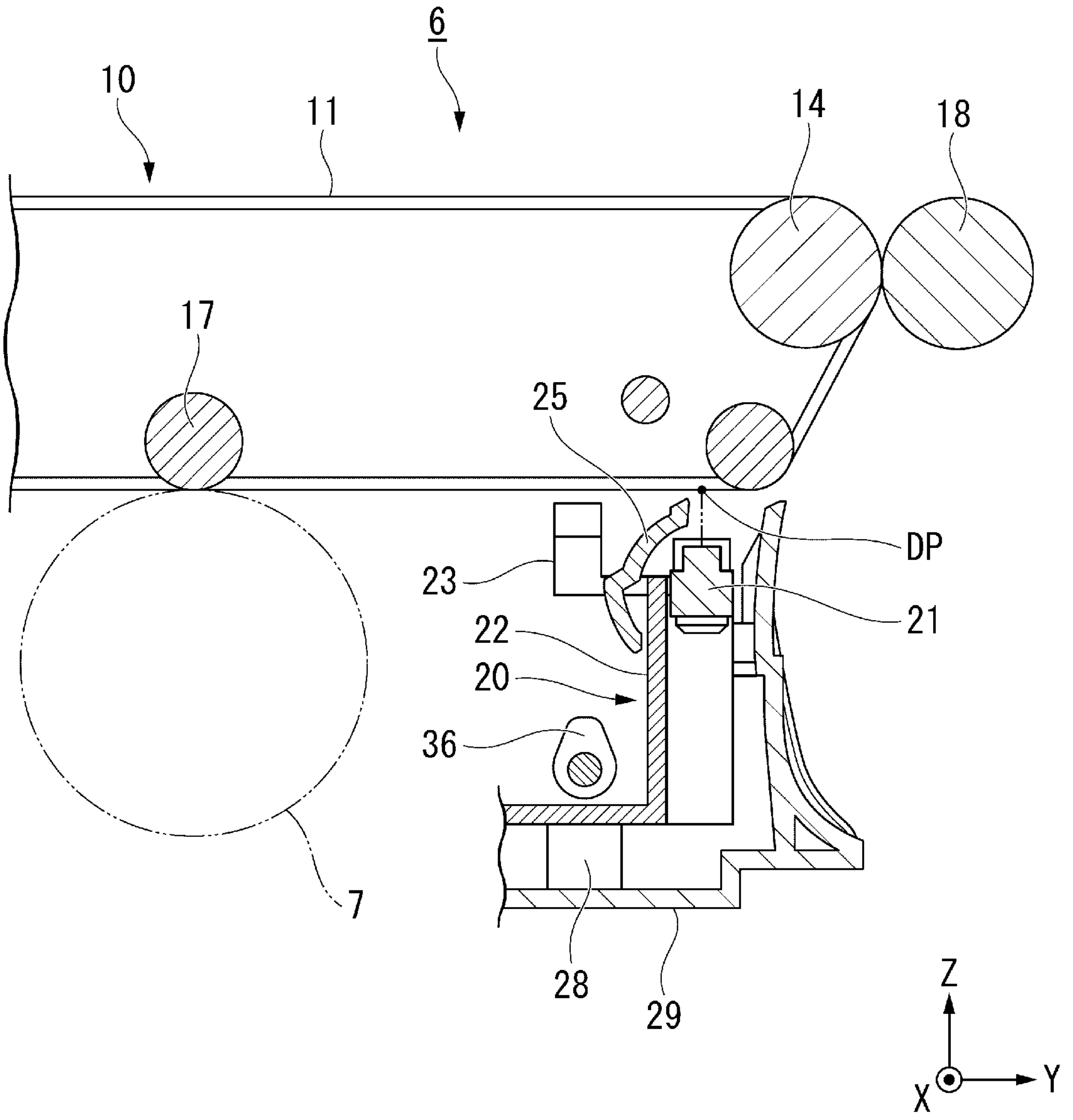
FIG. 3 is a front sectional view of the transfer unit.

FIG. 2 is a perspective view of the transfer unit 6. FIG. 3 is a front sectional view of the transfer unit 6. As illustrated in FIG. 3, the transfer unit 6 transfers a toner image on a photoconductive drum (an image carrying body) 7 onto a transfer belt (a transfer body) 11. The transfer unit 6 transfers the toner image on the transfer belt 11 onto a sheet. As illustrated in FIG. 2, the transfer unit 6 includes a transfer belt unit 10, a transfer belt contact and separation mechanism (a first mechanism) 40, a sensor unit 20, and a sensor moving mechanism (a second mechanism) 30.

The transfer belt unit 10 includes a transfer belt 11 and transfer belt frames 12.

The transfer belt 11 is an endless belt. As illustrated in FIG. 3, a driving roller 14 and a driven roller 15 (see FIG. 2) are disposed on the inner side of the transfer belt 11. Rotation axes of the driving roller 14 and the driven roller 15 are parallel to the X direction and disposed to be separated in the Y direction. The transfer belt 11 are laid over the outer circumferences of the driving roller 14 and the driven roller 15. The transfer belt 11 rotates according to rotation of the driving roller 14.

A primary transfer roller 17 is disposed on the inner side of the transfer belt 11. The primary transfer roller 17 is disposed on the opposite side of the photoconductive drum 7 across the transfer belt 11. A secondary transfer roller 18 is disposed on the outer side of the transfer belt 11. The secondary transfer roller 18 is disposed on the opposite side of the driving roller 14 across the transfer belt 11.

A toner image is formed on the outer circumference of the photoconductive drum 7. The toner image is an image of toner (a developer or a recording agent). The primary transfer roller 17 presses the transfer belt 11 against the photoconductive drum 7. The photoconductive drum 7 rotates according to rotation of the transfer belt 11. The toner image on the outer circumference of the photoconductive drum (the image carrying body) 7 is transferred onto the surface of the transfer belt (the transfer body) 11. A sheet is supplied to between the transfer belt 11 and the secondary transfer roller 18. The secondary transfer roller 18 presses the sheet against the transfer belt 11. The sheet moves according to rotation of the transfer belt 11. The toner image on the surface of the transfer belt 11 is transferred onto the surface of the sheet.

As illustrated in FIG. 2, the transfer belt frames 12 are disposed on both outer sides in the X direction of the transfer belt 11. The transfer belt frames 12 support the driving roller 14, the driven roller 15, the primary transfer roller 17, and the like explained above. The transfer belt frames 12 support the transfer belt contact and separation mechanism 40 explained below.

In maintenance of the image forming apparatus 1, a process unit including the photoconductive drum 7 (see FIG. 3) is sometimes removed from the image forming apparatus 1. In the maintenance, the transfer belt unit 10 is also sometimes removed from the image forming apparatus 1. At a start time of the maintenance, the transfer belt contact and separation mechanism 40 separates the transfer belt 11 from the photoconductive drum 7. At an end time of the maintenance, the transfer belt contact and separation mechanism 40 brings the transfer belt 11 into contact with the photoconductive drum 7. The transfer belt contact and separation mechanism 40 brings the transfer belt 11 into contact with and separates the transfer belt 11 from the photoconductive drum 7.

The transfer belt contact and separation mechanism 40 includes a lever 41, a first link 42, a primary transfer roller shifting mechanism 43.

The lever 41 extends in the +X direction from the transfer belt frame 12 in the +X direction. The lever 41 is capable of rotating around a rotation axis parallel to the X direction. A user of the image forming apparatus 1 manually rotates the lever 41. A pinion gear is disposed coaxially with the lever 41. The pinion gear rotates together with the lever 41.

The first link 42 is formed in a plate shape parallel to a YZ plane. The first link 42 is disposed in the +X direction of the transfer belt frame 12 in the +X direction. The first link 42 is capable of moving in the Y direction. The first link 42 includes a rack gear extending in the Y direction. The rack gear meshes with the pinion gear of the lever 41. The pinion gear of the lever 41 and the rack gear of the first link 42 configure a rack and pinion mechanism.

The primary transfer roller shifting mechanism 43 is disposed between the first link 42 and the primary transfer roller 17 (see FIG. 3). The primary transfer roller shifting mechanism 43 moves the primary transfer roller 17 in the Z direction.

At the start time of the maintenance of the image forming apparatus 1, the user rotates the lever 41 in the clockwise direction (a fourth direction). The first link 42 is moved in the −Y direction by the rack and pinion mechanism provided between the lever 41 and the first link 42. The primary transfer roller shifting mechanism 43 moves the primary transfer roller 17 illustrated in FIG. 3 in the +Z direction in association with the first link 42. The primary transfer roller 17 separates from the transfer belt 11. The transfer belt 11 separates from the photoconductive drum 7.

At the end time of the maintenance, the user rotates the lever 41 in the counterclockwise direction (a fifth direction). The first link 42 moves in the +Y direction. The primary transfer roller shifting mechanism 43 moves the primary transfer roller 17 in the −Z direction. The transfer belt 11 comes into contact with the photoconductive drum 7. The image forming apparatus 1 changes to a printable state.

The sensor unit 20 includes, as illustrated in FIG. 3, a sensor 21, a shutter 25, a sensor frame 22, and contact sections 23.

The sensor 21 detects a state of the surface of the transfer belt 11 in a detection position DP. The transfer belt 11 continuously passes the detection position DP of the sensor 21 by rotating. The sensor 21 detects a state of the surface of the transfer belt 11 that passes the detection position DP.

In this application, the Y direction (a first direction), the Z direction (a second direction), and the X direction (a third direction) of an orthogonal coordinate system are defined as follows. The Y direction is a moving direction of the transfer belt 11 in the detection position DP. The +Y direction is a downstream side in the moving direction of the transfer belt 11. The Z direction is a separating direction of the transfer belt 11 and the sensor 21 in the detection position DP. The +Z direction is a direction from the sensor 21 to the transfer belt 11 in the detection position DP. The X direction is a direction orthogonal to the Y direction and the Z direction. For example, the X direction is the width direction of the transfer belt 11. The +X direction is a direction in which the lever 41 is disposed with respect to the transfer belt 11.

The detection position DP of the sensor 21 is the vicinity of the end portion in the +Y direction of the transfer belt 11. The detection position DP of the sensor 21 is the surface in the −Z direction of the transfer belt 11. The sensor 21 is disposed to be separated in the −Z direction from the transfer belt 11 in the detection position DP.

The sensor 21 detects the concentration of the toner transferred onto the surface of the transfer belt 11. For example, the sensor 21 is a reflection-type optical sensor including a light emitting unit and a light receiving unit. The toner on the transfer belt 11 in the detection position DP is irradiated with light emitted from the light emitting unit of the sensor 21. Reflected light from the toner is made incident on the light receiving unit of the sensor 21. The sensor 21 detects the concentration of the toner based on the incident light on the light receiving section. An image is formed at appropriate concentration of the toner based on the concentration of the toner detected by the sensor 21. The quality of the image of the image forming apparatus 1 is maintained.

The shutter 25 is capable of rotating around a rotation axis parallel to the X direction. The shutter 25 is capable of opening and closing the light emitting unit and the light receiving unit of the sensor 21 by rotating. For example, if the image forming apparatus 1 starts printing, the sensor 21 carries out a detecting operation. If the sensor 21 starts the detecting operation, the shutter 25 opens the light emitting unit and the light receiving unit of the sensor 21. If the sensor 21 ends the detecting operation, the shutter 25 closes the light emitting unit and the light receiving unit of the sensor 21. The shutter 25 prevents the toner scattering from the transfer belt 11 from adhering to the light emitting unit and the light receiving unit of the sensor 21.

The sensor frame 22 supports the sensor 21. The sensor frame 22 is capable of moving in the Z direction. The sensor frame 22 is supported by a base frame 29. Relative positions of the base frame 29 and the transfer belt frames 12 are fixed. Urging members 28 are disposed between the sensor frame 22 and the base frame 29. For example, the urging members 28 are coil springs. The urging members 28 keep the sensor frame 22 in a floating state. The urging members 28 urge the sensor frame 22 in the +Z direction.

As illustrated in FIG. 2, the sensor frame 22 extends in the X direction. The sensor 21 includes a plurality of local sensors 21 disposed to be separated in the X direction. The plurality of local sensors 21 detect a state of the surface of the transfer belt 11 in detection positions different in the X direction. In an example illustrated in FIG. 2, the local sensors 21 are respectively disposed in positions opposed to the center and both the end portions in the X direction of the transfer belt 11. The sensor frame 22 supports the plurality of local sensors 21.

The contact sections 23 extend in the +Z direction from the sensor frame 22. The distal ends in the +Z direction of the contact sections 23 are capable of coming into contact with the end portions in the −Z direction of the transfer belt frames 12. The urging members 28 urge the sensor frame 22 in the +Z direction in which the contact sections 23 are brought into contact with the transfer belt frames 12. The contact sections 23 come into contact with the transfer belt frames 12, whereby the distance in the Z direction between the sensor 21 and the transfer belt 11 is set to a predetermined distance. Consequently, detection accuracy of the sensor 21 stabilizes.

The contact sections 23 are respectively disposed at both the end portions in the X direction of the sensor frame 22. The contact sections 23 respectively come into contact with the transfer belt frames 12 disposed on both the outer sides in the X direction of the transfer belt 11. The urging members 28 are respectively disposed in the vicinities of both the end portions in the X direction of the sensor frame 22. Consequently, the distance in the Z direction between the plurality of local sensors 21 and the transfer belt 11 is set to a predetermined distance.

The sensor moving mechanism 30 brings the sensor unit 20 into contact with and separates the sensor unit 20 from the transfer belt unit 10 in association with the transfer belt contact and separation mechanism 40. At the start time of the maintenance of the image forming apparatus 1, the sensor moving mechanism 30 separates the sensor unit 20 from the transfer belt unit 10. At the end time of the maintenance, the sensor moving mechanism 30 brings the sensor unit 20 into contact with the transfer belt unit 10.

The sensor moving mechanism 30 is supported by the base frame 29. The sensor moving mechanism 30 includes a second link 31, a cam driving gear 34 (see FIG. 4), and cams 36.

The second link 31 is disposed in the same position as the sensor frame 22 in the Y direction. The second link 31 is disposed in the +X direction of the sensor frame 22. The second link 31 extends in the Z direction. The end portion in the +Z direction of the second link 31 overlaps the first link 42. A rack gear (not illustrated) extending in the Z direction is set at the end portion in the −Z direction of the second link 31.

Figure 5:
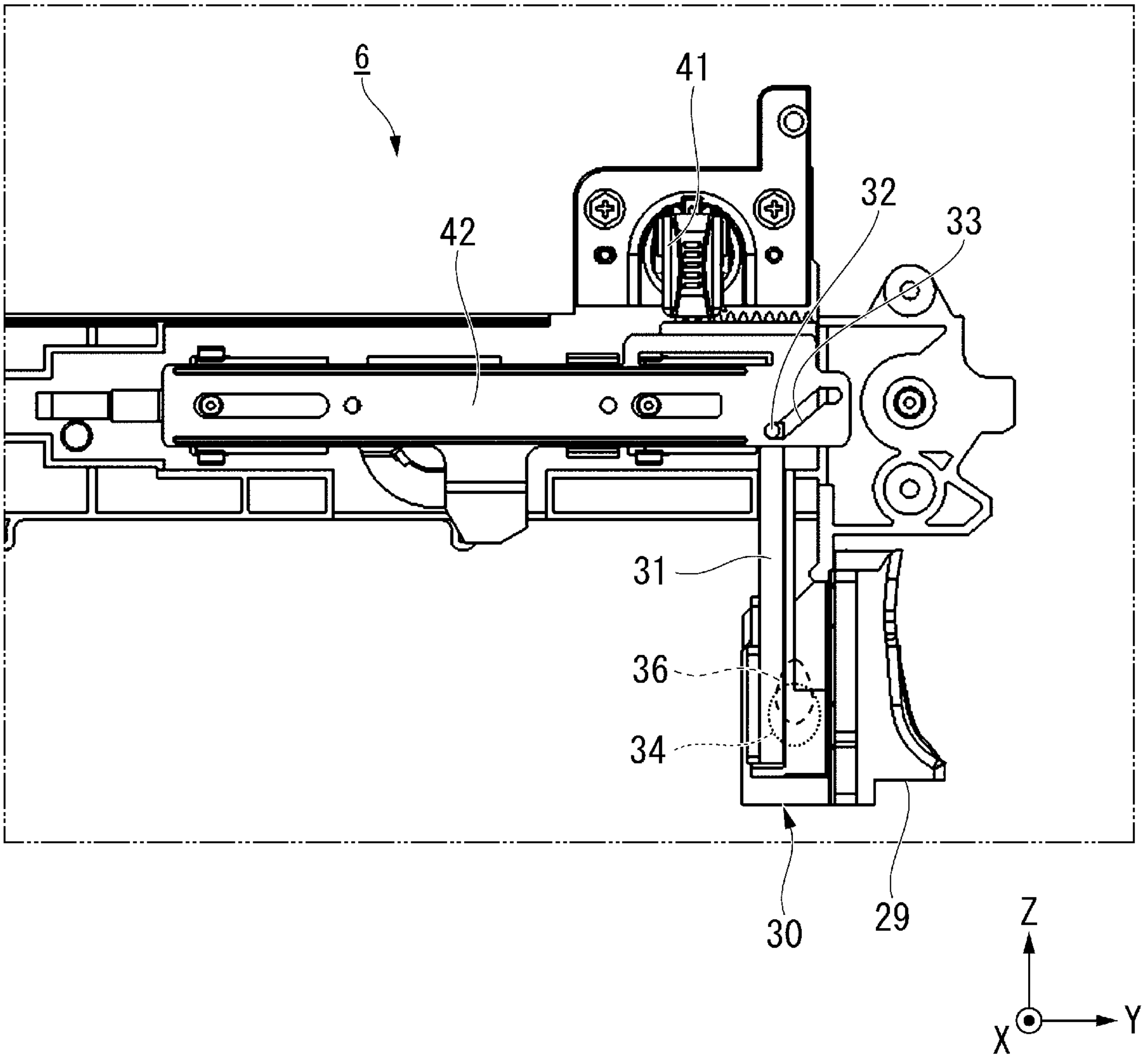
FIG. 5 is a front view of the transfer unit present in a printing operation position.

FIG. 5 is a front view of the transfer unit present in a printing operation position. The second link 31 includes a pin 32 at the end portion in the +Z direction. The pin 32 projects in the +X direction from the second link 31. The pin 32 engages in a guide groove 33 formed in the first link 42. The guide groove 33 inclines and extends in the Y direction and the Z direction. A first end portion of the guide groove 33 is disposed in the −Y direction and the −Z direction with respect to the center. A second end portion of the guide groove 33 is disposed in the +Y direction and the +Z direction with respect to the center. Pin holding grooves parallel to the Y direction are formed in the first end portion and the second end portion of the guide groove 33.

Figure 4:
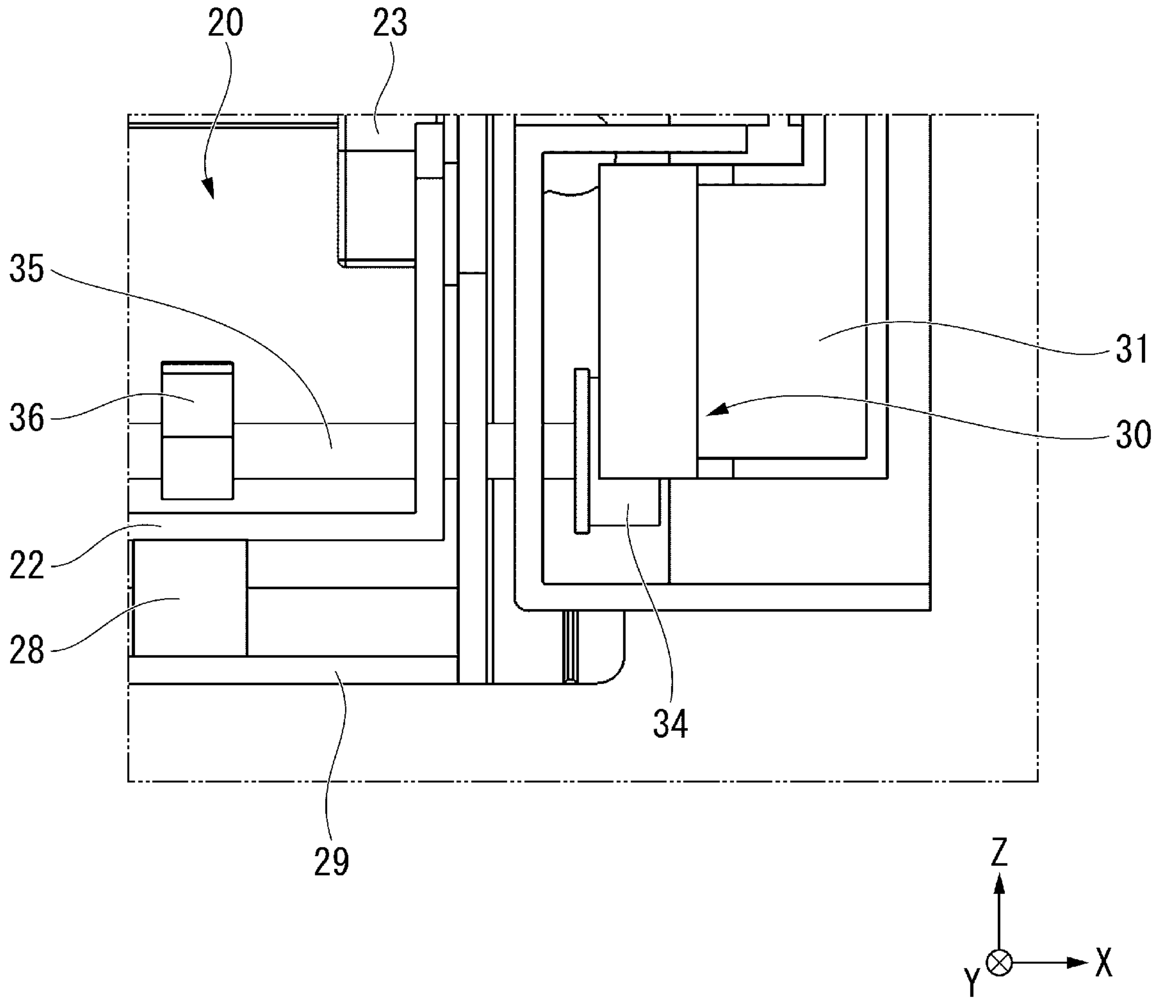
FIG. 4 is a side view of a sensor unit and a sensor moving mechanism.

FIG. 4 is a side view of the sensor unit 20 and the sensor moving mechanism 30.

The cam driving gear 34 is fixed to a shaft 35. The shaft 35 is rotatably supported by the base frame 29. The shaft 35 is capable of rotating around a rotation axis parallel to the X direction. The cam driving gear 34 is a pinion gear. The cam driving gear 34 meshes with the rack gear of the second link 31. The rack gear of the second link 31 and the cam driving gear 34 configure a rack and pinion mechanism.

The cams 36 are fixed to the shaft 35. The cams 36 rotate together with the cam driving gear 34. The shaft 35 includes a coupling (not illustrated) between the cam driving gear 34 and the cams 36. The shaft 35 can be separated and connected by coupling.

The cams 36 are disposed in the +Z direction of a cam contact surface of the sensor frame 22. The cams 36 are formed in an egg shape when viewed from the X direction. Far portions and near portions are formed in the outer circumferences of the cams 36. The far portions are portions most distant from the rotation axis of the shaft 35. The near portions are portions on the opposite side of the far portions across the rotation axis of the shaft 35. The near portions of the cams 36 do not come into contact with the cam contact surface of the sensor frame 22. The far portions of the cams 36 come into contact with the cam contact surface of the sensor frame 22. The far portions of the cams 36 move the sensor frame 22 in the −Z direction against an urging force of the urging members 28. Consequently, the sensor unit 20 separates from the transfer belt unit 10.

As illustrated in FIG. 2, the cams 36 are respectively disposed in the vicinities of both the end portions in the X direction of the sensor frame 22. The cams 36 are disposed in the +Z direction of the urging members 28 across the sensor frame 22. The cams 36 move the sensor frame 22 in the −Z direction equally in the X direction. Consequently, the sensor unit 20 separates from the transfer belt unit 10 equally in the X direction.

Operations of the transfer unit 6 at the start time and the end time of the maintenance are explained.

Figure 6:
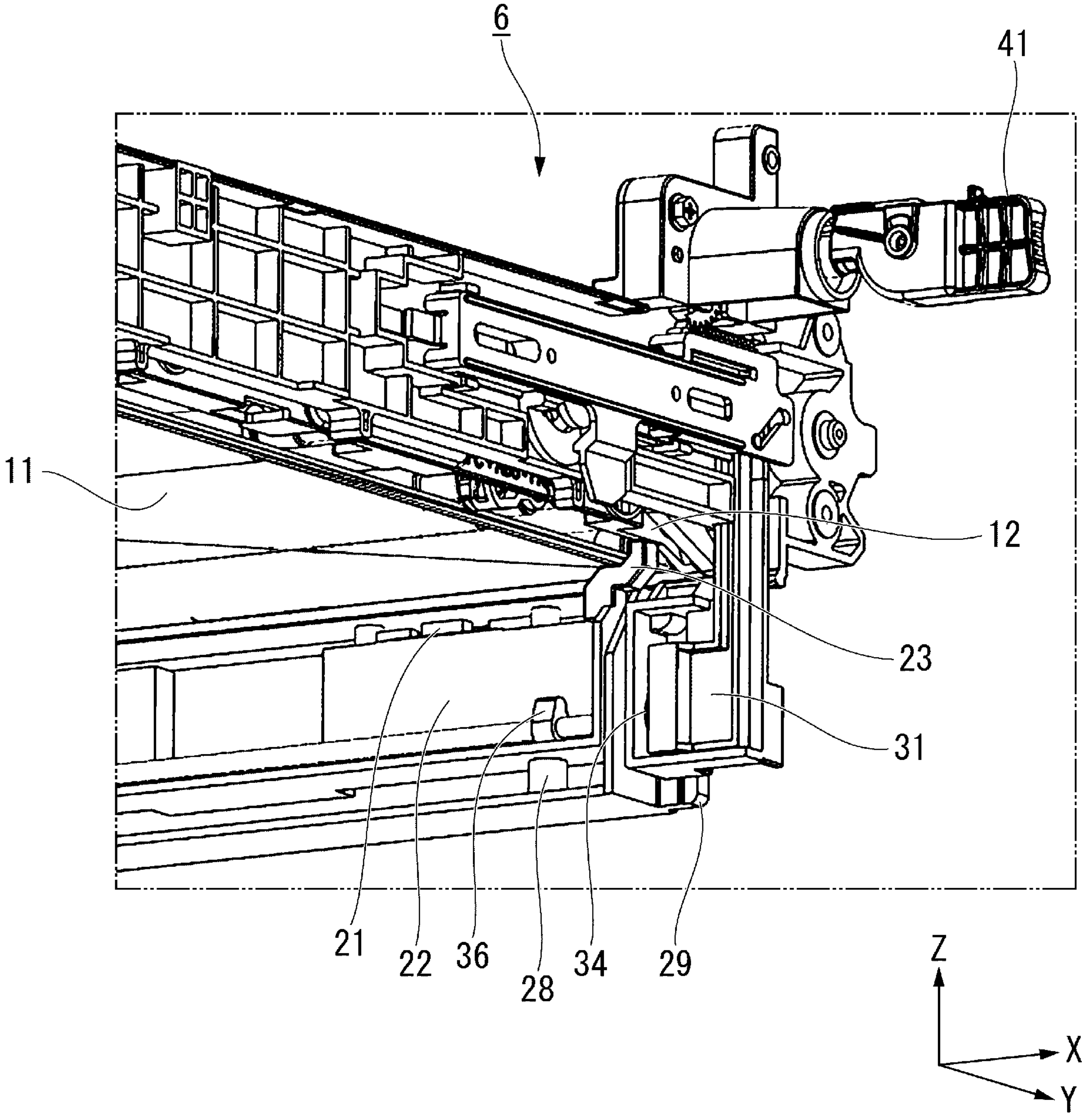
FIG. 6 is a perspective view of the transfer unit present in the printing operation position.

FIG. 5 is a front view of the transfer unit 6 present in the printing operation position. FIG. 6 is a perspective view of the transfer unit 6 present in the printing operation position. The transfer unit 6 is present in the printing operation position before the start of the maintenance. If the transfer unit 6 is present in the printing operation position, as illustrated in FIG. 3, the primary transfer roller 17 comes into contact with the transfer belt 11. If the transfer belt 11 rotates, a toner image on the photoconductive drum 7 is transferred onto the transfer belt 11. Further, the toner image on the transfer belt 11 is transferred onto a sheet. Printing can be carried out.

If the transfer unit 6 is in the printing operation position, as illustrated in FIG. 5, the first link 42 is disposed in the +Y direction. The pin 32 of the second link 31 is disposed at a first end portion in the −Y direction and the −Z direction of the guide groove 33 of the first link 42. The second link 31 is disposed in the −Z direction. As illustrated in FIG. 6, the cams 36 do not come into contact with the sensor frame 22. The sensor frame 22 is urged in the +Z direction by the urging members 28. The contact sections 23 of the sensor frame 22 come into contact with the transfer belt frames 12. The distance between the sensor 21 and the transfer belt 11 is set to a predetermined distance. The sensor 21 detects a state of the surface of the transfer belt 11.

Figure 7:
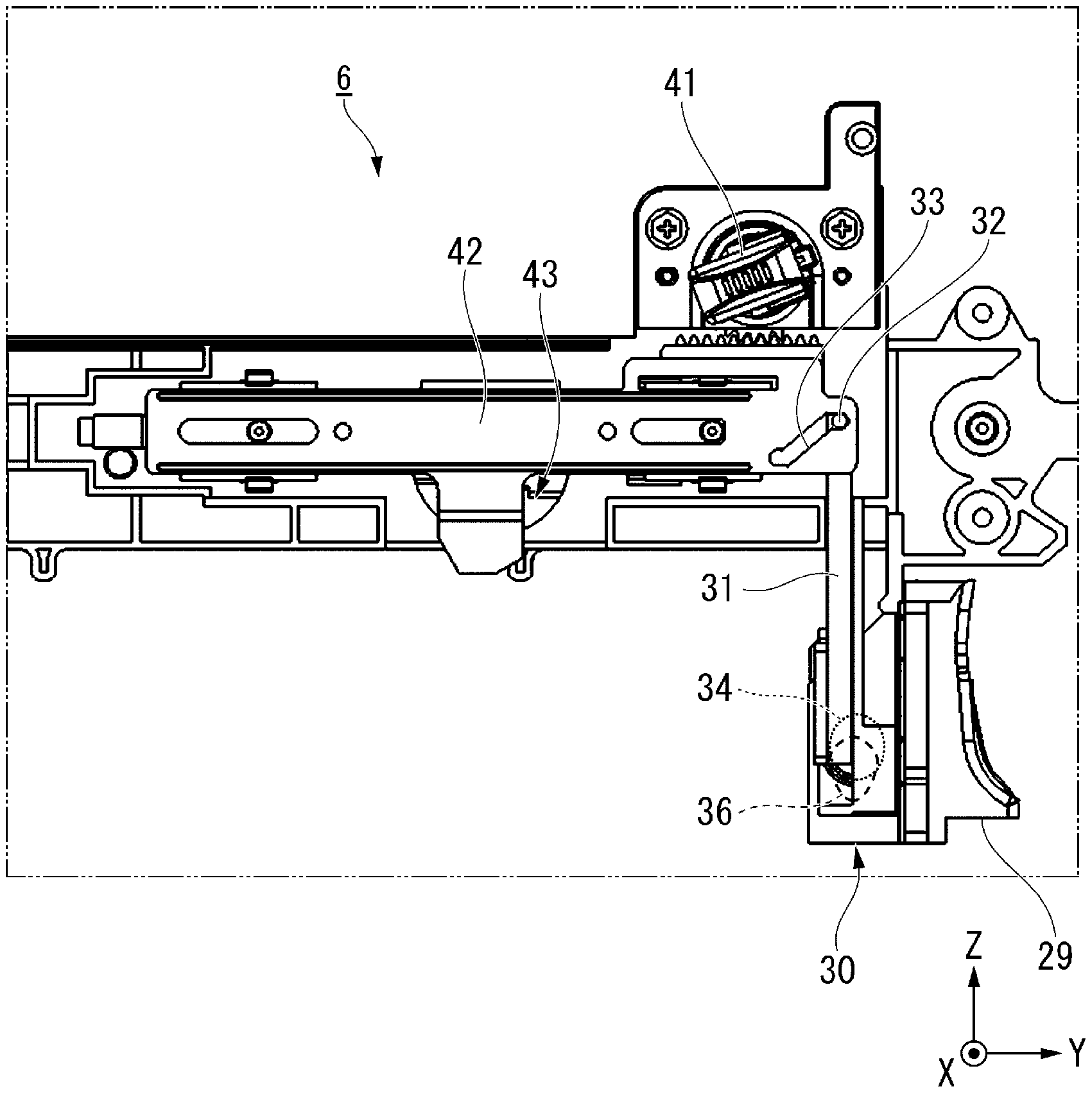
FIG. 7 is a front view of the transfer unit present in a maintenance position.
Figure 8:
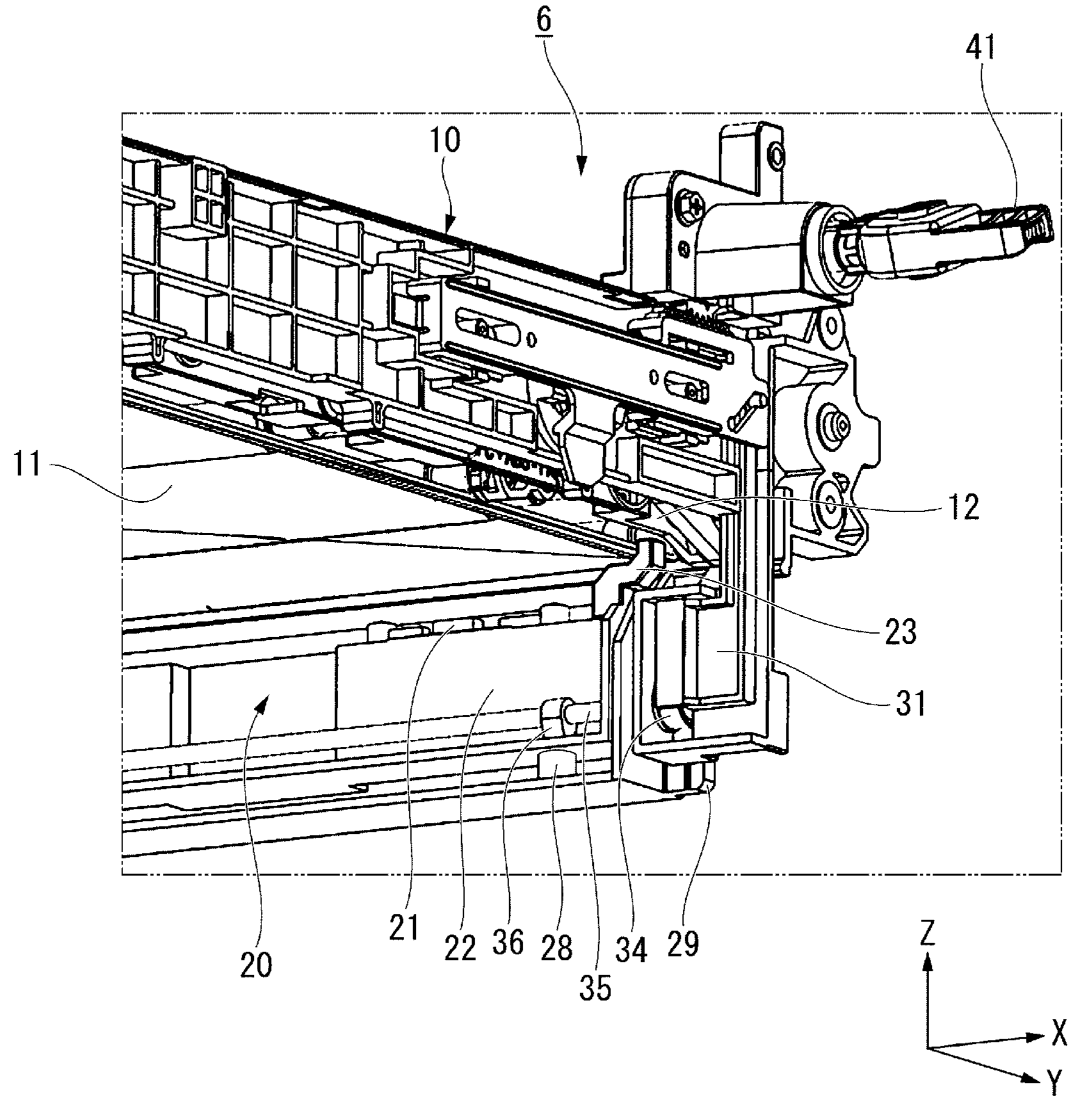
FIG. 8 is a perspective view of the transfer unit present in the maintenance position.

FIG. 7 is a front view of the transfer unit 6 present in a maintenance position. FIG. 8 is a perspective view of the transfer unit 6 present in the maintenance position. At the start time of the maintenance, the transfer unit 6 shifts from the printing operation position to the maintenance position. In the maintenance, the process unit including the photoconductive drum 7 (see FIG. 3) and the transfer belt unit 10 are sometimes removed from the image forming apparatus 1. The user of the image forming apparatus 1 causes the transfer belt contact and separation mechanism 40 to operate.

As illustrated in FIG. 7, the user rotates the lever 41 in the clockwise direction. The first link 42 is moved in the −Y direction by the rack and pinion mechanism between the lever 41 and the first link 42. The first transfer roller shifting mechanism 43 moves the primary transfer roller 17 (see FIG. 3) in the +Z direction in association with the first link 42. The primary transfer roller 17 separates from the transfer belt 11. The transfer belt 11 separates from the photoconductive drum 7. The process unit including the photoconductive drum 7 is removed from the image forming apparatus 1. At the removal time of the process unit, breakage of the photoconductive drum 7 and the transfer belt 11 due to contact of the photoconductive drum 7 and the transfer belt 11 is suppressed.

The sensor moving mechanism 30 operates in association with the transfer belt contact and separation mechanism 40. The guide groove 33 of the first link 42 guides the movement of the pin 32 of the second link 31. The pin 32 moves in the +Z direction according to the movement of the first link 42 in the −Y direction. The pin 32 moves to a second end portion in the +Y direction and the +Z direction of the guide groove 33. The second link 31 moves in the +Z direction together with the pin 32.

As illustrated in FIG. 8, the cam driving gear 34 is rotated by the rack and pinion mechanism between the second link 31 and the cam driving gear 34. The cams 36 rotate in association with the cam driving gear 34. The cams 36 move the sensor frame 22 in the −Z direction against the urging force of the urging members 28. The contact sections 23 of the sensor frame 22 separate from the transfer belt frames 12. The sensor 21 separates from the transfer belt 11. The sensor unit 20 is kept in a separated state from the transfer belt unit 10 by the cams 36.

The shaft 35 is separated in the coupling between the cam driving gear 34 and the cams 36. The transfer belt unit 10 is removed from the image forming apparatus 1. The sensor unit 20 is left in the image forming apparatus 1. Even if the transfer belt unit 10 is removed, the sensor unit 20 does not move in the +Z direction. At the removal time of the transfer belt unit 10, breakage of components of the sensor unit 20 and the transfer belt unit 10 due to contact of the components of the sensor unit 20 and the transfer belt unit 10 is suppressed. Breakage of the sensor 21 and the transfer belt 11 due to contact of the sensor 21 and the transfer belt 11 is suppressed. Breakage of the contact section of the sensor unit 20 and the transfer belt unit 10 due to contact of the contact section of the sensor unit 20 and the transfer belt unit 10 is suppressed.

The process unit including the photoconductive drum 7 and the transfer belt unit 10 are attached to the image forming apparatus 1 again. The maintenance of the image forming apparatus 1 ends. At the end time of the maintenance, the user rotates the lever 41 in the counterclockwise direction. The transfer unit 6 returns to the printing operation position from the maintenance position. The image forming apparatus 1 changes to the printable state.

As explained above in detail, the image forming apparatus 1 in the embodiment includes the photoconductive drum 7, the transfer belt 11, the transfer belt contact and separation mechanism 40, the sensor 21, and the sensor moving mechanism 30. The photoconductive drum 7 carries a toner image. The toner image is transferred onto the transfer belt 11 from the photoconductive drum 7. The transfer belt contact and separation mechanism 40 separates the transfer belt 11 from the photoconductive drum 7. The sensor 21 detects a state of the surface of the transfer belt 11. The sensor moving mechanism 30 separates the sensor 21 from the transfer belt 11 in association with the transfer belt contact and separation mechanism 40.

The sensor moving mechanism 30 operates in association with the transfer belt contact and separation mechanism 40. The sensor 21 separates from the transfer belt 11. At the maintenance time, operation of the sensor moving mechanism 30 is prevented from being forgotten. At the maintenance time, breakage of the transfer belt 11 and the sensor 21 due to contact of the transfer belt 11 and the sensor 21 is suppressed. Reliability at the maintenance time can be improved.

The image forming apparatus 1 further includes the transfer belt frames 12 and the sensor frame 22. The transfer belt frames 12 support the transfer belt 11. The sensor frame 22 supports the sensor 21 and include the contact sections 23 that come into contact with the transfer belt frames 12.

The image forming apparatus 1 further includes the urging members 28. The urging members 28 urge the sensor frame 22 in a direction in which the contact sections 23 are brought into contact with the transfer belt frames 12.

The contact sections 23 of the sensor frame 22 come into contact with the transfer belt frames 12 with the urging force of the urging members 28. The distance between the sensor 21 and the transfer belt 11 is set to the predetermined distance. Detection accuracy of the sensor 21 stabilizes and the quality of an image of the image forming apparatus 1 is maintained.

The sensor moving mechanism 30 includes the cams 36. The cams 36 rotate in association with the transfer belt contact and separation mechanism 40. The cams 36 move the sensor frame 22 in a direction in which the contact sections 23 are separated from the transfer belt frames 12.

The cams 36 move, against the urging force of the urging members 28, the contact sections 23 in the direction in which the contact sections 23 are separated from the transfer belt frames 12. Even if the transfer belt frames 12 are removed at the maintenance time, the contact sections 23 do not move toward the transfer belt frames 12. Breakage of the contact sections 23 of the sensor frame 22 and the transfer belt frames 12 due to contact of the contact sections 23 of the sensor frame 22 and the transfer belt frames 12 is suppressed.

The transfer belt contact and separation mechanism 40 includes the lever 41 and the first link 42. The lever 41 causes the transfer belt contact and separation mechanism 40 to operate. The first link 42 moves in the Y direction in association with the lever 41. The sensor moving mechanism 30 includes the second link 31 and the cam driving gear 34. The second link 31 moves in the Z direction orthogonal to the Y direction in association with the first link 42. The cam driving gear 34 rotates the cams 36 in association with the second link 31.

The sensor moving mechanism 30 associated with the transfer belt contact and separation mechanism 40 is realized with a simple configuration. Cost of the image forming apparatus 1 is reduced.

The transfer belt 11 is capable of moving in the Y direction. The sensor 21 is disposed to be separated from the transfer belt 11 in the Z direction orthogonal to the Y direction. The contact sections 23 are respectively disposed on both the outer sides of the transfer belt 11 in the X direction orthogonal to the Y direction and the Z direction.

The transfer belt 11 is capable of moving in the Y direction. The sensor 21 is disposed to be separated from the transfer belt 11 in the Z direction orthogonal to the Y direction. The sensor 21 includes the plurality of local sensors 21 disposed to be separated in the X direction orthogonal to the Y direction and the Z direction.

States of sections of the transfer belt are detected by the plurality of local sensors 21. The quality of an image of the image forming apparatus 1 is maintained. The contact sections 23 are disposed on both the outer sides in the X direction of the transfer belt 11. The distances between the plurality of local sensors 21 and the transfer belt 11 are equalized. Detection accuracy of the sensor 21 stabilizes.

The sensor 21 detects the concentration of the toner transferred onto the surface of the transfer belt 11.

An image is formed at appropriate concentration of the toner based on the concentration of the toner detected by the sensor 21. The quality of an image of the image forming apparatus 1 is maintained.

The sensor 21 is the reflection-type optical sensor including the light emitting unit and the light receiving unit. The sensor 21 includes the shutter 25 capable of opening and closing the light emitting unit and the light receiving unit.

The shutter 25 prevents the toner scattering from the transfer belt 11 from adhering to the light emitting unit and the light receiving unit of the sensor 21. Detection accuracy of the sensor 21 stabilizes. The quality of an image of the image forming apparatus 1 is maintained.

The image forming apparatus 1 further includes the lever 41. The lever 41 rotates in the clockwise direction to thereby cause the transfer belt contact and separation mechanism 40 and the sensor moving mechanism 30 to operate. The transfer belt contact and separation mechanism 40 brings the transfer belt 11 into contact with the photoconductive drum 7 according to rotation of the lever 41 in the counterclockwise direction opposite to the clockwise direction. The sensor moving mechanism 30 brings the sensor 21 close to the transfer belt 11 according to the rotation of the lever 41 in the counterclockwise direction.

The user rotates the lever 41 in the clockwise direction at the start time of the maintenance. The user rotates the lever 41 in the counterclockwise direction at the end time of the maintenance. The transfer belt contact and separation mechanism 40 and the sensor moving mechanism 30 operate in association with each other according to the rotation of the lever 41. Operation of the sensor moving mechanism 30 is prevented from being forgotten. Reliability at the maintenance time can be improved.

According to the at least one embodiment explained above, the image forming apparatus 1 includes the sensor moving mechanism 30 that separates the sensor 21 from the transfer belt 11 in association with the transfer belt contact and separation mechanism 40. Consequently, reliability at the maintenance time can be improved.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:
- an image carrying body configured to carry an image of a developer;
- a transfer body onto which the image of the developer is transferred from the image carrying body;
- a first mechanism configured to separate the transfer body from the image carrying body;
- a sensor configured to detect a state of a surface of the transfer body; and
- a second mechanism configured to separate the sensor from the transfer body, wherein
- the transfer body is configured to move in a first direction,
- the sensor is disposed so as to be separated from the transfer body in a second direction orthogonal to the first direction, and
- the sensor includes a plurality of local sensors disposed to be separated in a third direction orthogonal to the first direction and the second direction.

2. The image forming apparatus according to claim 1, further comprising:
- a transfer body frame configured to support the transfer body; and
- a sensor frame configured to support the sensor and including contact sections that come into contact with the transfer body frame.

3. The image forming apparatus according to claim 2, further comprising an urging member configured to urge the sensor frame in a direction to bring the contact sections into contact with the transfer body frame.

4. The image forming apparatus according to claim 3, wherein the second mechanism rotates in association with the first mechanism and includes a cam that moves the sensor frame in a direction in which the contact sections are separated from the transfer body frame.

5. The image forming apparatus according to claim 4, wherein
- the first mechanism includes a lever that causes the first mechanism to operate and a first link that moves in a first direction in association with the lever, and
- the second mechanism includes a second link that moves in a second direction orthogonal to the first direction in association with the first link and a cam driving gear that rotates the cam in association with the second link.

6. The image forming apparatus according to claim 2, wherein
- the transfer body is configured to move in a first direction,
- the sensor is disposed so as to be separated from the transfer body in a second direction orthogonal to the first direction, and
- the contact sections are respectively disposed on both outer sides of the transfer body in a third direction orthogonal to the first direction and the second direction.

7. The image forming apparatus according to claim 1, wherein the sensor detects concentration of the developer transferred onto a surface of the transfer body.

8. The image forming apparatus according to claim 1, wherein the sensor is a reflection-type optical sensor including a light emitting component and a light receiving component and includes a shutter capable of opening and closing the light emitting component and the light receiving component.

9. The image forming apparatus according to claim 1, further comprising a lever configured to rotate in a fourth direction to thereby cause the first mechanism and the second mechanism to operate, wherein
- the first mechanism brings the transfer body into contact with the image carrying body according to rotation of the lever in a fifth direction opposite to the fourth direction, and
- the second mechanism brings the sensor close to the transfer body according to the rotation of the lever in the fifth direction.

10. The image forming apparatus according to claim 1, further comprising:
- a sensor frame configured to support the plurality of local sensors.

11. An image forming method, comprising:
- carrying an image of a developer on an image carrying body;
- transferring onto a transfer body the image of the developer from the image carrying body;
- separating the transfer body from the image carrying body using a first mechanism;
- detecting a state of a surface of the transfer body using a sensor;

separating the sensor from the transfer body using a second mechanism;

moving the transfer body in a first direction; and is disposed so as to be separating the sensor from the transfer body in a second direction orthogonal to the first direction, the sensor including a plurality of local sensors disposed to be separated in a third direction orthogonal to the first direction and the second direction.

12. The image forming method according to claim 11, further comprising:

supporting the transfer body on a transfer body frame; and supporting the sensor on a sensor frame including contact sections that come into contact with the transfer body frame.

13. The image forming method according to claim 12, further comprising urging the sensor frame in a direction to bring the contact sections into contact with the transfer body frame.

14. The image forming method according to claim 13, further comprising rotating the second mechanism in association with the first mechanism and using a cam to move the sensor frame in a direction in which the contact sections are separated from the transfer body frame.

15. The image forming method according to claim 14, further comprising:

causing the first mechanism to operate and a first link that moves in a first direction in association with a lever; and moving in a second direction orthogonal to the first direction in association with the first link and a cam driving gear that rotates the cam in association with a second link.

16. The image forming method according to claim 12, further comprising:

moving the transfer body in a first direction; and separating the sensor from the transfer body in a second direction orthogonal to the first direction.

17. The image forming method according to claim 11, further comprising detecting concentration of the developer transferred onto a surface of the transfer body.

18. The image forming method according to claim 11, wherein the sensor is a reflection-type optical sensor including a light emitting component and a light receiving component and includes a shutter capable of opening and closing the light emitting component and the light receiving component.

19. The image forming method according to claim 11, further comprising rotating a lever in a fourth direction to thereby cause the first mechanism and the second mechanism to operate;

bringing the transfer body into contact with the image carrying body according to rotation of the lever in a fifth direction opposite to the fourth direction; and bringing the sensor close to the transfer body according to the rotation of the lever in the fifth direction.

20. The image forming method according to claim 11, further comprising: supporting the plurality of local sensors.

* * * * *